United States Patent [19]
Krembs

[11] Patent Number: 5,566,292
[45] Date of Patent: Oct. 15, 1996

[54] METHODS FOR DETECTING THE CLOSEST EXISTING POINT ON A SPLINE OR POLYLINE

[75] Inventor: Mary C. Krembs, Kingston, N.Y.

[73] Assignee: International Business Machines Corporation, Armonk, N.Y.

[21] Appl. No.: 870,030

[22] Filed: Apr. 17, 1992

[51] Int. Cl.⁶ .................................................. G06T 11/00
[52] U.S. Cl. .......................................... 395/142; 395/143
[58] Field of Search ........................... 395/119–121, 126, 395/127, 133, 134, 140–143, 16, 17, 127, 132, 133; 340/723, 728, 729, 739, 747; 382/44–48; 345/16, 17, 127, 132, 133

[56] References Cited

U.S. PATENT DOCUMENTS

| | | | |
|---|---|---|---|
| 4,819,192 | 4/1989 | Kuragano et al. | 395/121 |
| 4,989,152 | 1/1991 | Cheng | 364/474.24 |
| 5,031,114 | 7/1991 | Yamagami | 395/134 |
| 5,040,130 | 8/1991 | Chang et al. | 395/134 |
| 5,065,344 | 11/1991 | Kishimoto et al. | 395/134 |
| 5,079,719 | 1/1992 | Maillot | 395/134 |
| 5,113,490 | 5/1992 | Winget | 395/119 |

OTHER PUBLICATIONS

IBM Publication SH20–5621–04 "Graphics Program Generator Program Reference" Fourth Edition (1990).

*Primary Examiner*—Almis R. Jankus
*Attorney, Agent, or Firm*—Wm. Kinnaman, Jr.; Heslin & Rothenberg, P.C.

[57] ABSTRACT

Processes for efficiently determining the subset of points, included in a given ordered set of points, that lie at a minimum distance from an arbitrarily specified point in a given coordinate system (for a modelling system, computer graphic system, and the like), operating under the control of, or with the assistance of, a digital computer. The novel processes are operative to transform a first set of signals representing the arbitrarily specified point and the given ordered set of points (in the given coordinate system), into a second set of signals identifying the subset of points, belonging to the ordered set of points, which are located at a minimum distance from the specified point, utilizing bounding box techniques. Such techniques facilitate obtaining a solution to the minimum distance determination problem without always having to determine the distance between all of the points in the given, ordered set of points, and the arbitrarily specified point, as required by the prior art. As a result, the processes contemplated by the invention conserve and make efficient use of computing resources.

52 Claims, 5 Drawing Sheets

METHODS FOR DETECTING THE CLOSEST EXISTING POINT ON A SPLINE OR POLYLINE

BACKGROUND OF THE INVENTION

1. Field of the Invention

The invention relates generally to geometric modeling systems that, with the aid of a digital computer, may be used to capture, manipulate, analyze and report data. Examples of such systems include geographical positioning systems (GPS), geographic information systems (GIS), computer aided design (CAD) systems and computer aided manufacturing (CAM) systems. More particularly, the invention relates to methods which enable the subset of points, included in a given ordered set of points, that lie at a minimum distance from an arbitrarily specified point (in a given modeling coordinate system, for the modeling system supported by the digital computer), to be efficiently determined. The invention is particularly useful in situations where the given ordered set of points define a spline or polyline, and may also be applied in computer graphic systems to support graphics processing functions.

2. Definitions

The following terms and phrases are used herein and defined as follows:

1. A "polyline" is a set of at least two vertices and connecting line segment(s).
2. A "modeling system" is a system that may be used to process (capture and manipulate) real world data and events, and process abstract data based on real world data and events. Examples of modeling systems include, but are not limited to, geographical positioning systems (GPS), geographic information systems (GIS), computer aided design (CAD) systems and computer aided manufacturing (CAM) systems.
3. "A modeling coordinate system" is a coordinate system which maps out a space that can completely contain all of the spatial or geometric data that a user can process using a given modeling system, in terms of a user's own units (e.g., feet, miles, degrees, etc.).
4. A "database coordinate system" is a coordinate system that accommodates the storage of data from a users modeling coordinate system without the loss of accuracy.
5. A "device coordinate system" is a coordinate system which maps out the available space on a given device (for example, a display device), into which data may be mapped. The data may, for example, be supplied via user interaction with a display device, may be mapped from (or to) a modeling coordinate system and/or database coordinate system, etc.
6. An "ordered" set of points is a set of points having a unique integer value assigned to each point in the set.
7. A "spline" is a piecewise polynomial curve of degree k with up to k−1 continuous derivatives at the common joints between segments. Note, for example, that a polyline is a linear spline.

3. Description of the Prior Art

In present day modeling systems which are used, for example, for GIS, GPS, CAD and CAM applications, it is often desirable to determine from a given ordered set of points, such as an ordered set of points defining a spline or polyline (in a modeling coordinate system defined for the modeling system), which point(s) from the set is (are) closest to another arbitrarily specified point (location) in the modeling coordinate system.

Such modeling systems typically operate under the control of, or with the aid of, a digital computer. An example of one such system is the commercially available IBM 5080 computer system on which the commercially available Graphics Program Generator (GPG) software may be executed ("IBM" is a trademark owned by the International Business Machines Corporation). The GPG software is described in IBM publication number SH20-5621-04, entitled "Graphics Program Generator Program Reference", fourth edition, copyright 1990, hereby incorporated by reference to describe a present day, commercially available system in which the invention may find application.

It is known that computers that support modeling systems, computer graphics systems, etc. (such as the IBM 5080), may be used to transform a first set of signals representing a given arbitrarily specified point and a given ordered set of points (in, for example, a given modeling coordinate system), into a second set of signals identifying tile subset of points, belonging to said ordered set of points, which are located at a minimum distance from the specified point.

The known methods utilized to perform such transformations (i.e., to determine the subset of points, belonging to an ordered set of points, which are located at a minimum distance from a specified point in a given coordinate system, sometimes referred to hereinafter as "minimum distance determination methods"), can be computationally intensive. This is particularly true as the number of points being analyzed goes up, when the modeling system utilizes a 3-dimensional modeling coordinate system, and/or when the given set of points defines a spline or polyline (as compared with, for example, a simple ellipse or a circle), and can lead to an inefficient use of computing resources. In some cases, such as where many thousands or even millions points need to be analyzed, computing resources exceeding those available on a users system may be required to make the aforementioned determination.

The reason that the aforementioned problems exist using known minimum distance determination methods may be readily understood and appreciated by considering an ordered set of points which define a spline or polyline. Since the path that a spline or polyline may take is unpredictable, the only previously known way to guarantee that the proper closest point determination is made involves computing the distances exhaustively between the specified point and each (and every) point in the given ordered set of points. The distance computation for each pair of points requires summing up squares of differences and then taking the square root of the result (applying the well known Pythagorean theorem).

It should be noted that in addition to modeling systems per se, computer graphics systems also have a need to utilize minimum distance determination methods. For example, such methods are useful in processing hidden surface data.

Accordingly, it would be desirable to provide a new minimum distance determination method that can be used in geometric modeling systems and other systems (such as computer graphics systems), to guarantee the convergence to the correct solution of the aforementioned minimum distance determination problem, and at the same time reduce the amount of computation that is needed to solve such problems compared with the known minimum distance determination methods.

With respect to prior art in the field of computer graphics processing per se (as opposed to the aforementioned, more general, modeling systems which may or may not include graphics packages), those skilled in the art will readily appreciate that computer graphics systems are known in which boundary and edge areas are defined, shaded, deleted, etc., by using area clipping methods.

For example, Chang et al in, U.S. Pat. No. 5,040,130, issued Aug. 13, 1991, discloses a method for clipping a line segment boundary-defined area against a limiting plane and a related clipped extraneous edge deletion method, both for use in computer graphics display systems where graphics figures are represented by polylines of data corresponding to line segment boundary-defined areas.

Further examples of prior art computer graphics systems that utilize bounding box/clipping regions to clip polygons to lie (fit) within windows on computer output displays, to accelerate the presentation of graphic objects on such displays, to facilitate area fill processes, etc., may be found with reference to U.S. Pat. No. 5,079,719, issued Jan. 7, 1992, to Maillot; U.S. Pat. No. 5,031,114, issued Jul. 9, 1991, to Yamagami ; and U.S. Pat. No. 4,819,192, issued Apr. 4, 1989, to Kuragano et al.

In the aforementioned Yamagami patent, in order to clip a figure using a predetermined frame, coordinate values of cross points defined by a line segment representing each side of a figure to be clipped and each side of a clipping frame, or each extension line thereof, are detected. A positional relationship between the line segment and the clipping frame, and the presence or absence of cross points on the clipping frame, are obtained, respectively.

By utilizing this information, a new boundary line that did not exist in the figure before clipping can be extracted. In effect, the Yamagami patent teaches a method that determines intersections between line segments and uses this information to define boundary segments corresponding to the boundary of an object with reference to a display screen.

Although the Yamagami patent is representative of prior art that utilizes bounding box/clipping methods in graphics systems to speed up processing; nowhere, does Yamagami, or indeed any other known reference, teach, claim or even suggest using bounding box/clipping methods as part of a minimum distance determination method. As will be demonstrated hereinafter with reference to the detailed description of the invention, it would be desirable and advantageous (from the point of view of the efficient use of computing resources), to be able to provide a minimum distance determination method that utilizes bounding box/clipping techniques to determine which points, from a given ordered set of points, to discard as candidates for being closest to an arbitrarily selected point.

In the aforementioned Kuragano et al patent, tables indicating the distance between a curved surface and an observing point are formed, for use in hidden surface processing, illustrating an application for the present invention in the context of a computer graphic system. In particular, Kuragano et al teaches a system within which it is desirable to find the closest point in a given ordered set of points (on the curved surface), from an arbitrarily specified point (the observing point). However, none of the teachings in Kuragano et al are directed to the minimum distance determination methods per se.

Other background art exists which is directed to solving the problem of determining the distance between two arbitrary surfaces; as opposed to solving the problem of determining the distance between a given specified point and a given ordered set of points, in a modeling coordinate system or other coordinate system (such as a coordinate system used by a computer graphics package). Such background material is useful in understanding how distance determinations between pairs of points (on the different surfaces) are presently determined in prior art modeling and computer graphics systems.

For example, Cheng, in U.S. Pat. No. 4,989,152, issued Jan. 29, 1991, teaches a method for finding all the intersection curves of two surfaces and the absolute shortest distance "d" between the surfaces. Such methods have application in performing clearance checking for tool paths in CAD/CAM systems, etc. However, the method taught by Cheng involves constructing a plane vector field VF induced by the two given surfaces, and does not address directly solving the aforementioned minimum distance problem when only a single specified point and a given ordered set of points are given.

Still further examples of background prior art, which are directed to solving the problem of determining the distance between two arbitrary surfaces, giving insight into the present state of art and minimum distance determination techniques used in modeling and computer graphics systems (and their applications), can be found with reference to Japanese Patent JP 62-135975, issued Jun. 18, 1987; Japanese Patent JP 1-282684, issued Nov. 14, 1989; and U.S. Pat. No. 5,065,344, issued Nov. 12, 1991, to Kishimoto et al. None of these references however, or indeed any of the known prior art, is directed to providing a minimum distance determination method (as defined hereinabove), which does not require the above described exhaustive computation of distances between each point in a given ordered set of points, and an arbitrarily specified point, in a predefined coordinate system.

SUMMARY OF THE INVENTION

Accordingly, it is an object of the invention to be able to provide efficient minimum distance determination methods (as defined hereinbefore) suitable for use in modeling systems, computer graphics systems and the like, operating under the control of, or with the assistance of, a digital computer.

It is a further object of the invention to be able to provide efficient minimum distance determination methods which guarantee the convergence to the correct solution of the minimum distance determination problem and at the same time reduce the amount of computation that is needed to solve such problems when compared with the known minimum distance determination methods.

Furthermore, it is a specific object of the invention to be able to provide efficient minimum distance determination methods that are especially well suited to solving minimum distance determination problems in modeling systems, computer graphics systems, and the like, given an ordered set of points defining a spline or polyline, and an arbitrarily specified point, in a predefined multi-dimensional (for example, 3-dimensional) coordinate system.

Further yet, it is an object of the invention to be able to provide a minimum distance determination method that utilizes "bounding box" (a square in 2-dimensions and a cube in 3-dimensions)/clipping techniques to determine which points, from a given ordered set of points, to discard as candidates for being closest to an arbitrarily selected point in a predefined multi-dimensional coordinate system.

According to the invention, the aforementioned objectives may be achieved by utilizing a minimum distance determination method, for determining the subset of points, included in a given ordered set of points, that lies at a minimum distance from an arbitrarily specified point in a given coordinate system (for a modelling system, computer graphic system, and the like), operating under the control of, or with the assistance of, a digital computer, comprising the steps of: (a) providing the digital computer with a database for the aforementioned modeling system, graphics system, etc., including, at least, a first set of signals representing the arbitrarily specified point and a given ordered set of points, in the given coordinate system; (b) transforming, with the aid of the computer, the first set of signals into a second set of signals identifying the subset of points, belonging to the ordered set of points, which are located at a minimum distance from the specified point, wherein said step of transforming includes the steps of: (b1) defining in the given coordinate system, with the aid of the computer, a third set of signals which represent the vertices of a geometric object for which the distance between the specified point and each side of the object, along the orthogonal axis defining the given coordinate system, is the minimum distance d between the specified point and the end points of the ordered set of points; (b2) traversing the given ordered set of points in accordance with the specified order, with the aid of the computer, starting at either either endpoint (where the two end points are sometimes referred to hereinafter as the "first and second end points"), sequentially testing each point in the given ordered set of points to determine if it lies within the object represented by the third set of signals; (b3) deriving the points in the aforementioned given ordered set of points, that lie a minimum distance from the specified point, from the subset of points determined to lie within said geometric object; and (c) storing the second set of signals in the database.

According to a further aspect of the invention, the aforementioned step of deriving (step b3), for each point under test determined to be within the object during said step of traversing, comprises the steps of: (a) calculating in the computer the minimum distance d' between the aforementioned specified point and the point under test in said step of traversing; (b) comparing in the computer the distance measures d and d', to determine if distance measure d' is less than or equal to distance measure d; and (c) reducing the size of the previously defined object, whenever distance measure d' is determined to be less than distance measure d in step (b), by replacing the members of the aforementioned third set of signals with signals that represent the vertices of a new smaller object, where the distance between the specified point and each side of the new smaller object, along an orthogonal axis defining the given coordinate system, is d'.

According to yet another aspect of the invention, the aforementioned minimum determination method further comprise the steps of: (a) replacing the second set of signals stored in the database, whenever distance measure d' is determined to be less than distance measure d, with signals representing the coordinates of the point under test, and with signals representing minimum distance measure d'; and (b) adding to the second set of signals, stored in the computer database, signals representing the coordinates of the point under test whenever distance measure d' is determined to be equal to distance measure d, whereby the resultant second set of signals, stored in said computer database after the processing of the last point in said ordered set of points, is the transformation of said first set of signals into a set of signals identifying the subset of points, belonging to said ordered set of points, which are located at a minimum distance from said specified point.

Further aspects of the invention are directed toward (a) utilizing "bounding" boxes (squares or cubes, depending on coordinate system dimension), to perform the desired transformation from the aforementioned first set of signals, to the aforementioned second set of signals, to solve the minimum distance determination problem, (b) specific methods of operating both modeling systems and computer graphics systems to perform the aforementioned transformation (and thereby solve the minimum distance determination problem), and (c) particularly utilizing the new methods to solve the minimum distance determination problem when the given ordered set of points defines a spline or polyline.

The invention feature the ability to rapidly solve the minimum distance determination problem in modeling systems, computer graphics systems, and the like, efficiently (i.e., conserving data processing resources), even where the number of points defined is large and the reference coordinate system is multi-dimensional.

These and other objects and features of the present invention and the manner of obtaining them will become apparent to those skilled in the art, and the invention itself will be best understood by reference to the following detailed description read in conjunction with the accompanying Drawing.

BRIEF DESCRIPTION OF THE DRAWING

FIG. 1 depicts portions of a commercially available Geographic Information System (GIS) in which the invention may be practiced

DETAILED DESCRIPTION

Figure 1:
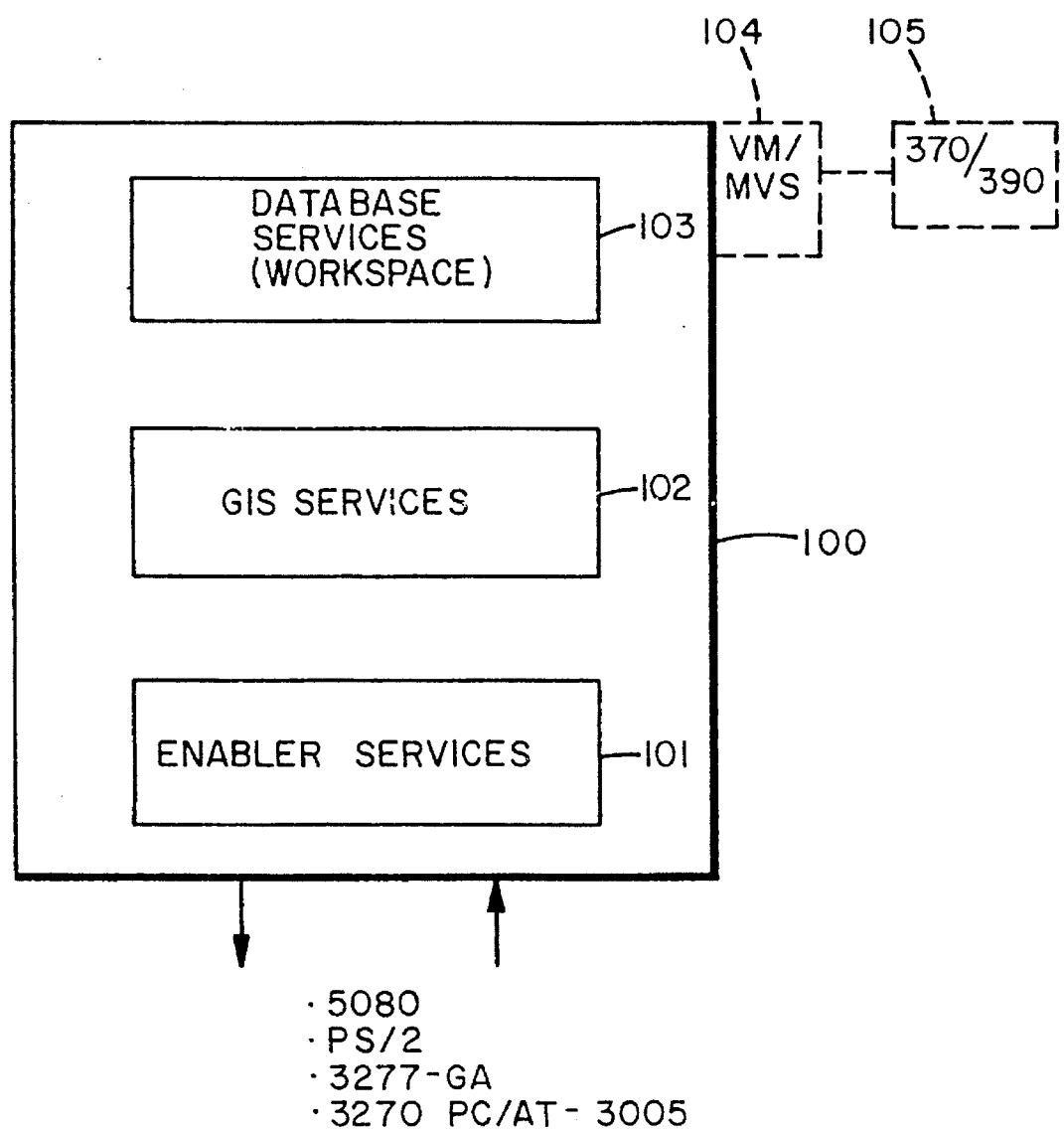
FIG. 1 depicts in block diagram form the elements of an exemplary prior art modeling system in which the invention may be advantageously used. In particular.

FIG. 1 depicts in block diagram form the elements of an exemplary prior art modeling system in which the invention may be advantageously used. Although such systems are well known by those skilled in the art, a brief overview of a commercially available geographic Information System (GIS) in which the invention may be practiced will, for the sake of completeness, be described with reference to FIG. 1.

The exemplary GIS system depicted in FIG. 1 can be realized by a combination of the aforementioned GPG software, as described in the previously incorporated reference, and, for example, the aforementioned IBM 5080 computer system, operating in a IBM System 370/390 environment. The GPG software, IBM 5080 and IBM 370/390 computers referred to hereinabove are all commercially available hardware and software products.

Other computer systems that can support the illustrative GPG GIS system in the exemplary system 370/390 environment include commercially available IBM PS/2 products, the IBM 3277-GA and the IBM 3270 PC/AT-3005. Each of the aforementioned products typically include a display, mouse, optional digitizer, and keyboard for allowing the user to interface with GIS 100 (as depicted in FIG. 1) via the Enabler Services 101 portion of GIS 100, also depicted in FIG. 1. Generally speaking the Enabler Services 101 portion of a GIS system, like GIS 100, services input/output requests between the user and the rest of the GIS system.

The next portion of GIS 100 depicted in FIG. 1 is the hardware and software making up GIS Services portion, 102 of the system. Several typical GIS Services, such as those provided by the aforementioned GPG software, are identified and will be explained in greater detail hereinafter with reference to FIG. 2. For now it is sufficient to say that these services could be, for example, CAD/CAM services, GPS services, accounting services, etc., and involve (1) the capture of data (for example, a mouse pointing to a river bed and tracing the river over a screen); (2) the manipulation of data (for example, moving a road on a map, moving the location of a fire hydrant, etc.); (3) the analysis of data (such as solving the aforementioned minimum distance determination problem which is the subject of the present invention); and (4) reporting the results of GIS Services processing (for example, generating a report, plotting points and/or drawing points on a display screen, etc.).

FIG. 1 also depicts a Database Services portion 103 of GIS 100, which manages work space (also contained within Database Services portion 103 of GIS 100) allocated to the GIS Services portion 102 of GIS 100; and an operating system 104 (such as, for example, the commercially available VM or MVS operating system), for managing the interface between GIS 100 and a host computer (a main frame interactive product), such as the aforementioned IBM System 370/390 computer (shown at 105 in FIG. 1).

Figure 2:
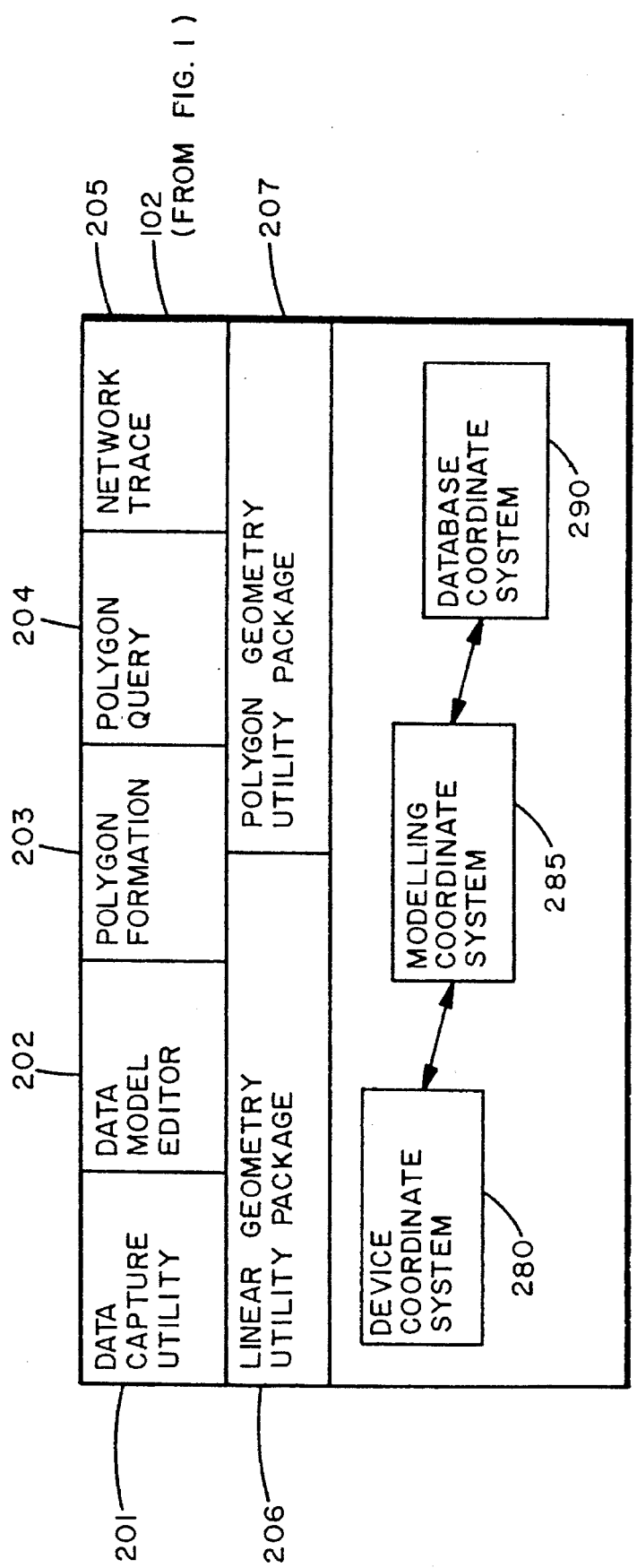
FIG. 2 depicts in greater detail the GIS Services portion of the exemplary GIS system depicted in FIG. 1.

As indicated hereinabove, FIG. 2 depicts in greater detail the GIS Service portion (portion 102 in FIG. 1) of the exemplary GIS system 100 depicted in FIG. 1. The exemplary GIS Services portion 102 is shown to include (usually in the form of software) a Data Capture utility (201); a Data Model Editor (202); Polygon Formation and Polygon Query sections (203 and 204, respectively); a Network Trace section (205); Linear and Polygon Geometry utility packages (206 and 207, respectively); and software (not shown in FIG. 2) for converting between a set of defined coordinate systems, such as the device, modelling and database coordinate systems depicted in FIG. 2 at 280, 285 and 290 (with the various coordinate systems being defined as set forth hereinbefore).

The Data Capture utility 201 may be used to capture data input to GIS 100 via Enabler Services 101, by, for example, the aforementioned mouse pointing to a river bed and tracing the river over a screen coupled to GIS 100.

Data Model Editor 202 may, for example, be used to perform a data analysis function which involves obtaining a solution to the aforementioned minimum distance determination problem (which is the subject of the present invention).

Polygon Formation section 203 and Polygon Query section 204, may be used to literally form polygons given a set of data points, to analyze data in such a way as to answer questions such as "How close is the nearest fire hydrant to a piece of property represented by a given polygon?", etc.

Network Trace section 205 may be used, for example, to determine the shortest path between two nodes in a given network.

The Linear Geometry utility package 206 depicted in FIG. 2 may, for example, be used to transform a first set of signals, representing a given point and a given set of points (in a defined coordinate system), into a second set of signals representing (and thereby indicating) those points in the first set of signals (which are a subset of the given set of points), which lie at a minimum distance from the given point (i.e., to solve the aforementioned minimum distance determination problem), when called upon to do so by, for example, Data Model Editor 202.

Once again, the known processes for performing such a transformation (to solve the minimum distance determination problem) are inefficient (for the reasons set forth hereinbefore), and providing efficient processes for solving the minimum distance determination problem by, for example, utilizing a package, such as Linear Geometry utility package 206, in the context of a modeling system, such as GIS 100, is the subject matter of the present invention.

To complete the description of GIS Services portion 102 of GIS 100, it should be noted that Polygon Geometry utility package 207, may, for example, be used to compare the area of parcels, determine the length of the perimeter of an object, etc.

Having described a commercially available modelling system (in particular a GIS system) in which the invention may be practiced, with specific reference to exemplary sections of the GIS Services portion 102 of GIS 100 where prior art processes for solving the aforementioned minimum distance determination problem are in some systems employed; attention will now be directed to how the invention may be applied to solve practical problems in a modeling system (such as a geographic information system), and specifically how to solve such problems efficiently utilizing a step by step process for operating a modeling system (or computer graphics system), with the aid of a digital computer.

The novel process, like its predecessors, involves transforming a first set of signals, representing a given arbitrarily specified point and a given ordered set of points in said modeling coordinate system, into a second set of signals identifying the subset of points, belonging to the ordered set of points, which are located at a minimum distance from the specified point. However, according to processes contemplated by the invention, it is no longer always necessary to determine the distances between the specified point and each of the points in the set of ordered points, in order to perform the desired transformation from the aforementioned first set of signals to the aforementioned second set of signals.

Figure 3:
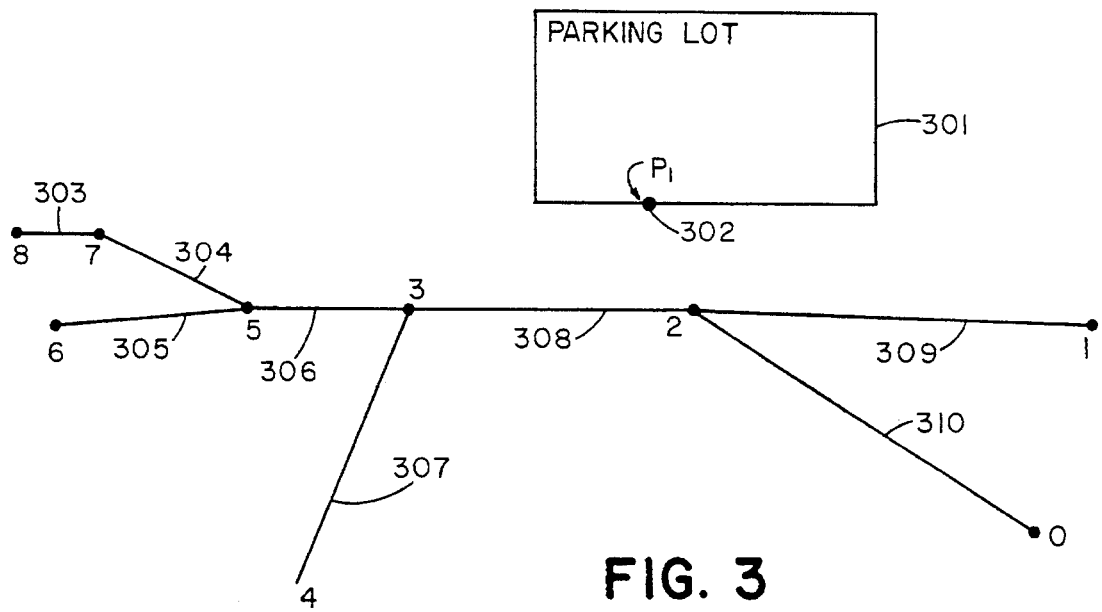
FIG. 3 depicts an example of a practical problem, set forth in the context of a modeling system used as a geographical information system (GIS), which may be efficiently solved utilizing the present invention.

Before setting forth the details of processes contemplated by the invention, reference should be made to FIG. 3 for an example of how the invention (and in fact, other techniques for solving the minimum distance determination problem as well), can be used to solve practical problems.

FIG. 3 depicts an example of a shopping mall parking lot, 301; which has a specified entry location, point, $p_1$, at location 302; and a set of roadway segments, 303–310, which have traffic control signals located at the nine points labeled 0–8. The problem to be solved is to determine which traffic control signal is the closest to the shopping mall entrance $p_1$ so that location $p_1$ and the nearest traffic control signal can be linked by a roadway. The object is to use an existing traffic control signal in combination with the shortest amount of new roadway, to provide an effective (and safe) path for drivers to enter and leave the shopping mall.

For the example depicted in FIG. 3, the line segments (8-7, 7-5, 6-5, 5-3, 4-3, 3-2, 2-1, and 2-0) connecting points 0–8, form a connected set of polylines. The points are ordered (0–8), and point $p_1$ is, for the purpose of this illustrative example, an arbitrarily specified point from which it is desired to determine the point (or set of points) in the set of ordered points 0–8, lying at a minimum distance from $p_1$.

According to the known method for solving the minimum distance determination problem posed with reference to FIG. 3, the distances between, $p_1$ and each of points 0–8, would need to be determined. These distances would than need to be compared with one another. Finally, the point or points being located at the minimum distance from $p_1$ could then be identified.

In modelling systems and graphic computer systems, calculating the squares and square roots necessary to calculate the distance between a pair of points, is costly in terms of available processing power, speed, etc. Hence, any way of eliminating or minimizing the number of these operations that need to be performed can greatly improve the performance of such systems.

According to one embodiment of the invention, a generalized method of operating a modeling system (or computer graphics system), including a predefined coordinate system, with the aid of a digital computer, to transform a first set of signals representing a given arbitrarily specified point and a given ordered set of points in the coordinate system, into a second set of signals identifying the subset of points, belonging to the ordered set of points, which are located at a minimum distance from the specified point, comprises the steps of:

(a) providing the digital computer with a database for the modeling (or computer graphics) system including, at least, a first set of signals representing an arbitrarily specified point and a given ordered set of points, including first and second end points, in the coordinate system;

(b) calculating in the computer, by processing the first set of signals, the distance $d_1$ between the specified point and the first end point, and the distance $d_2$ between the specified point and the second end point;

(c) comparing in the computer the values $d_1$ and $d_2$ to determine which end point lies at minimum distance d from said specified point;

(d) selecting in the computer an end point lying at minimum distance d from said specified point;

(e) storing, in the database of the computer as a second set of signals, signals representing the coordinates of the selected end point and minimum distance measure d;

(f) defining in the coordinate system, with the aid of said computer, whenever the coordinate system is 3-dimensional (2-dimensional), a third set of signals which represent the vertices of a cube (square), where the distance between the specified point and each side of the cube (square), along an orthogonal axis defining the given coordinate system, is d;

(g) traversing the given ordered set of points in accordance with the specified order, with the aid of said computer, starting at either of said first and second end points, sequentially testing each point to determine if it lies within the cube (square) represented by the third set of signals, and performing following steps (g1)–(g5) for each point under test determined to be within the cube (square):

(g1) calculating in the computer the minimum distance d' between said specified point and the point under test in step (g);

(g2) comparing in the computer the distance measures d and d', to determine if distance measure d' is less than or equal to distance measure d;

(g3) reducing the size of the previously defined cube (square), whenever distance measure d' is determined to be less than distance measure d in step (g2), by replacing the members of the third set of signals with signals that represent the vertices of a new smaller cube (square), where the distance between the specified point and each side of the new smaller cube (square), along an orthogonal axis defining the given coordinate system, is d';

(g4) replacing the second set of signals stored in the computer database, whenever distance measure d' is determined to be less than distance measure d in step (g2), with signals representing the coordinates of the point under test, and with signals representing minimum distance measure d'; and (g5) adding to the second set of signals, stored in said computer database, signals representing the coordinates of the point under test whenever distance measure d' is determined to be equal to distance measure d in step (g2), whereby the resultant second set of signals, stored in said computer database after the processing of the last point in said ordered set of points, is the desired transformation of said first set of signals into a set of signals identifying the subset of points, belonging to said ordered set of points, which are located at a minimum distance from said specified point.

With reference to the above described process, after it is determined which of the two end points is closer to the given location and the value "d" is determined (at steps (c) and (d) of the above described process), it is certain that the closest point in the given ordered set of points must then lie on or within a circle/sphere of radius d about the given (specified) point. So at this point all that needs to be determined is which, if any, of the remaining points in the given ordered set of points set lie on or within the sphere (for 3-dimensional coordinate systems)/or circle (for 2-dimensional coordinate systems).

To reduce the complexity of the remaining calculations, according to the preferred embodiment of the invention, the sphere or circle (as appropriate for the dimensions of the coordinate system) is circumscribed with a cube (for a sphere)/or square (for a circle) in such a way that the sides are tangent to the sphere/circle and are parallel to the X–Y–Z planes (or X–Y lines as appropriate). Any point that was in the sphere/circle then must lie in the cube/square. The sides are chosen to be parallel with the planes so that the determination of whether or not a point should be discarded is simply a matter of comparing coordinates.

According to an alternate characterization of the invention, the process invented to reduce the amount of computation needed to find the closest existing point in a given ordered set of points, to a specified point, all in a predefined coordinate system, (in a modeling system, computer graphics system, and the like), is as follows:

First, calculate the distance between the given location/point and the two end points in the given ordered set of points (which inherently must have a pair of end points).

Next, take the minimum of the distances and define a geometric object (for example, a cube if the data is in 3-dimensions, a square if in 2-dimensions), about the location such that the distance between the location and any side of the object equals that minimum distance found in the aforementioned first step. For the sake of simplicity in this explanation, it will be assumed that the given data is in a 3-dimensional coordinate system. Those skilled in the art will readily appreciate that the processes contemplated by the invention can easily be used in 2-dimensional coordinate systems, as will be demonstrated hereinafter in the context of an illustrative example described with reference to FIGS. 4A–4E.

This is a simple calculation, as indicated hereinabove, if (in the exemplary 3-dimensional coordinate system) the cube is formed such that the sides are parallel with the X–Y–Z planes. Each side can be determined by subtracting and adding the minimum distance to each coordinate of the location in turn, effectively circumscribing the cube within a sphere having a radius equal to the minimum distance as determined the first step.

For example, if the location given has coordinates (2,3,4) and minimum distance was found to be 4, then the sides of the cube are the planes X=−2, X=6, Y=−1, Y=7, Z=0, Z=8. Clearly, this cube must at least contain the closer of the two end points.

Next, store the coordinates of the point yielding the minimum distance, as well as the distance measurement itself. Then, arbitrarily choose one end of the ordered set of points to be the starting point. There is no guaranteed benefit in picking either end.

The next step is to traverse the set of points (in accordance with the ordering assigned to the ordered set of points), testing each point to see if it lies within the cube. This can be easily done by comparing the (x,y,z) coordinates of a given point with the coordinates of the planes making up the sides of the cube.

(a) If a point from the set does lie in the cube, then calculate the distance between it and the location. If that distance is smaller than the previous minimum, reduce the size of the cube accordingly. Reset the minimum distance, and the point yielding that distance.

(b) If a point does not lie in the cube, simply discard it without calculating the distance. Clearly it cannot be the closest point.

(c) If more than one point lies at the current minimum distance, a list of all such points should, according to a preferred embodiment of the invention, be maintained until a smaller distance is found.

Finally, after all points in the given ordered set of points have been tested, the minimum distance and the closest point(s) will be both be known.

The above described process is guaranteed to converge to an answer since the original cube/square is guaranteed to contain at least the one original end point.

The main benefit of the processes contemplated by the invention is that they can substantially reduce the amount of computation needed to solve the minimum distance determination problem. As the list is traversed, the cube/square is reduced in size. Thus, fewer and fewer distance calculations need to be performed. The only calculations needed on each point are simple comparisons with the sides of the bounding cube/square. The processes contemplated by the invention are efficient, easy to understand, and easy to implement. Also, it is certain to find the correct answer, and can easily contend with multiple correct answers.

The following specific example, described with reference to FIGS. 4A–4E, assumes a given set of 9 known points, each denoted by a *, in 2-dimensions (like the example set forth hereinbefore with reference to FIG. 3), connected by polyline 401; and a specified location 402 (denoted by a star). The problem to be solved (making reference to FIG. 4A) is to determine the closest existing point on polyline 401 to location 402 (just like looking for the closest point on the connected set of polylines shown in FIG. 3, with respect to point $p_1$).

Figure 4A:
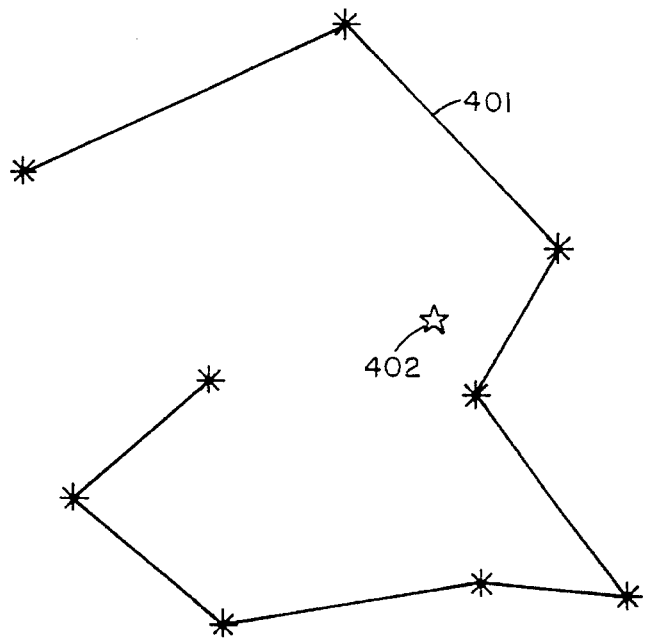
FIGS. 4A–4E depict several of the steps involved in performing one embodiment of the minimum distance determination method contemplated by the invention, i.e., the steps involved in efficiently performing the desired transformation of a first set of signals representing an arbitrarily specified point and a given ordered set of points, in a given coordinate system (with the aid of a computer), into a second set of signals identifying the subset of points, belonging to the ordered set of points, which are located at a minimum distance from the specified point.
Figure 4B:
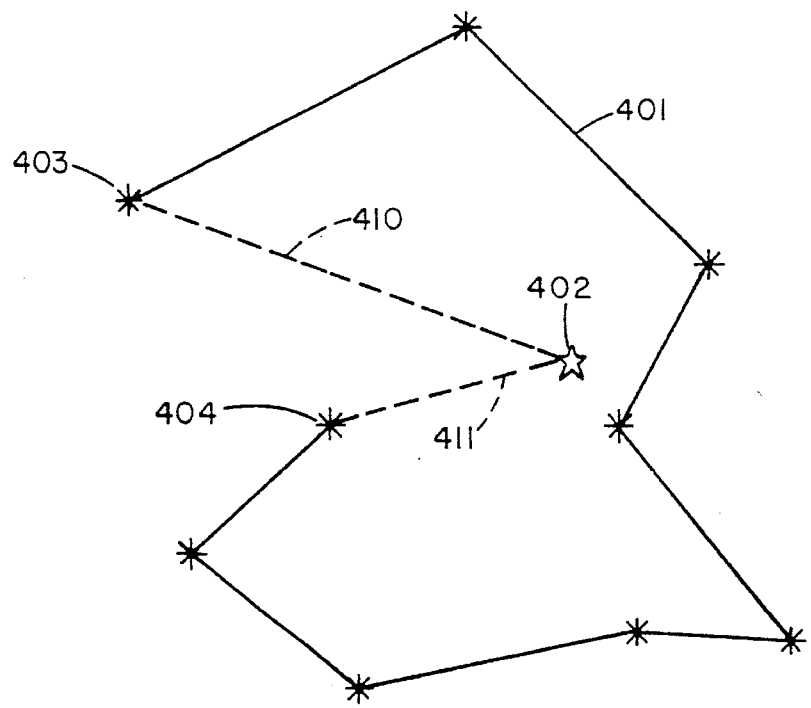

According to the illustrative embodiment of the invention being described with reference to FIGS. 4A–4E, the first step (step 1) is to determine the distance between location 402 and the two end points, 403 and 404, shown by dotted lines 410 and 411 in FIG. 4B.

Figure 4C:
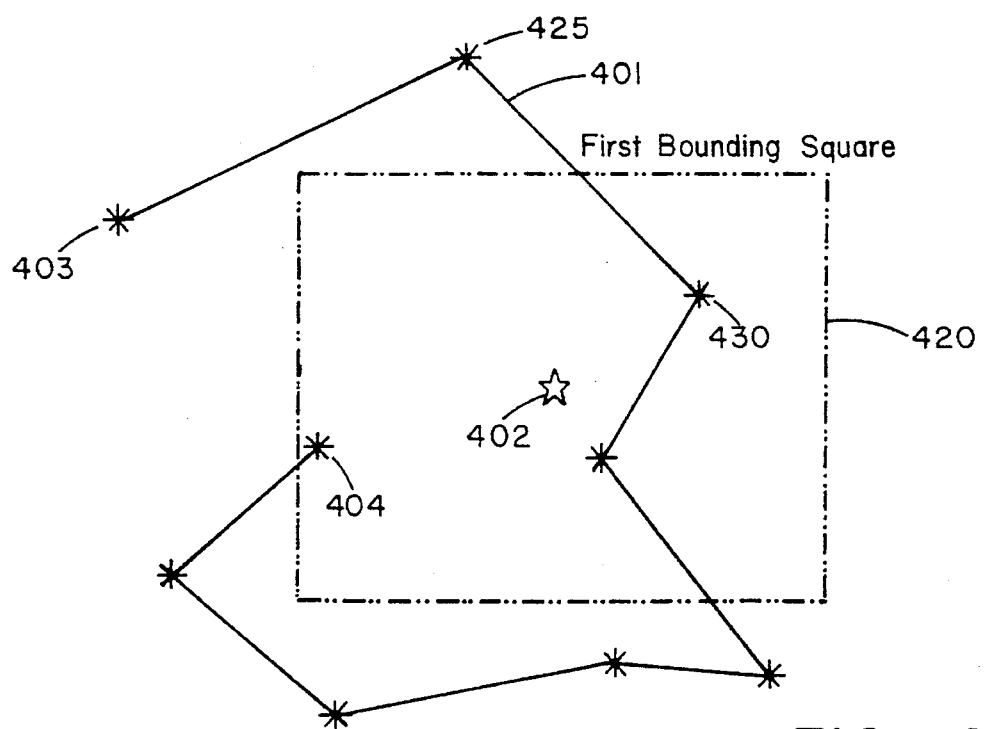

Furthermore, according to this illustrative embodiment of the invention, the next step is to create a first bounding square, shown as 420 in FIG. 4C, about location 402, based on the minimum of the distances determined in step 1, utilizing the above described technique of creating a circle (around location 402) having a radius equal to the minimum distance, and circumscribing the aforementioned square about the circle (for the sake of clarity the circle is not shown in FIG. 4C).

Next, according to this illustrative implementation of the invention, the end point, from the ordered set of points, not yielding the minimum distance (i.e., end point 403), is arbitrarily selected as the "starting point" (the process being described herein will work just as well by selecting the other end point, 404, as the starting point), for traversing the ordered set of points and performing the aforementioned tests on each point.

It is clear, making reference to FIG. 4C, that point 403 is not within square 420 and neither is the second point on polyline 401, namely point 425. Since point 425 is not inside square 420, the above described process requires that point 425 be discarded for consideration as a solution to the minimum distance determination problem (without ever having calculated the distance between point 425 and location 402).

The next point on polyline 401, namely point 430, is then tested. This point (430) is inside bounding square 420 and yields a distance shorter than the previous minimum (with respect to location 402). Thus, point 430 is determined (at least for the time being) to be the closest point on polyline 401 to location 402, and bounding square 420 is, according to the invention, reduced in size. The reduction in size of bounding square 420 may be seen with reference to FIG. 4D where second bounding box 450 replaces bounding box 420.

Figure 4D:
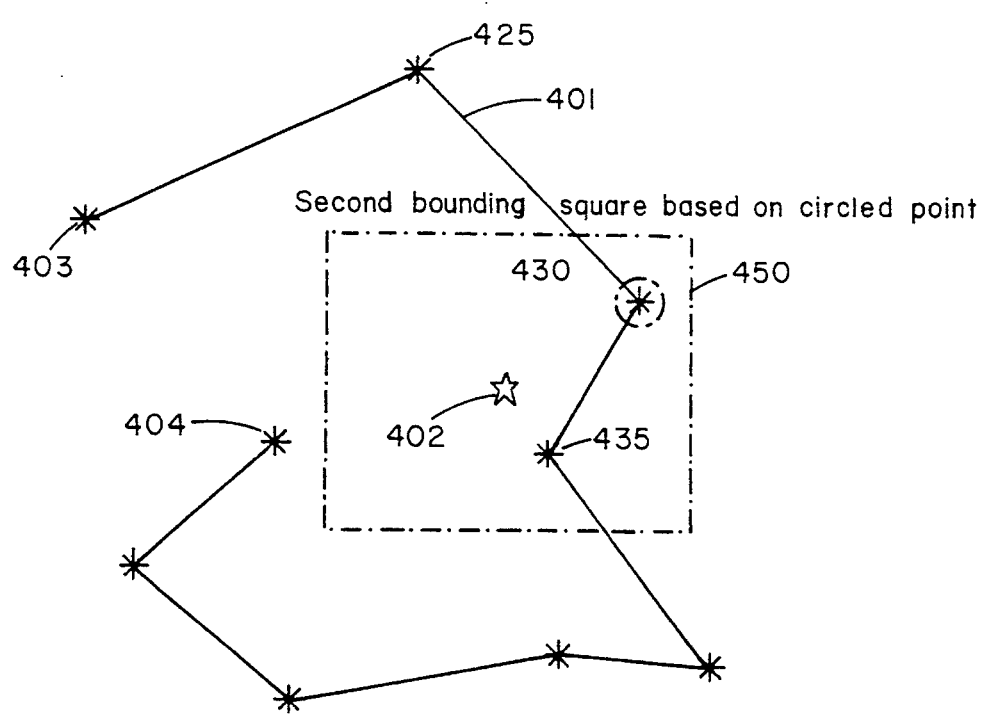
Figure 4E:
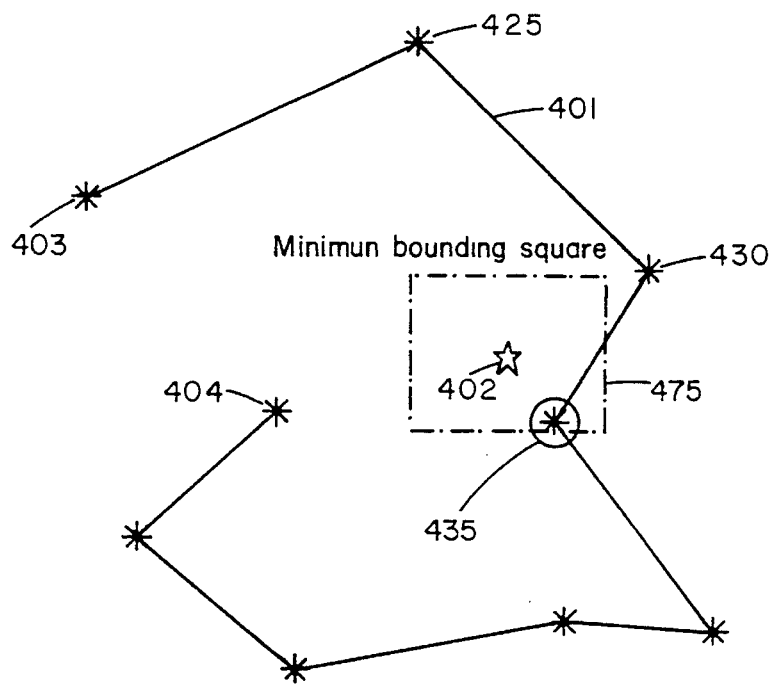

The fourth point to be tested, point 435 on polyline 401, is inside square 450 (as shown in FIG. 4D) and so the above described process is repeated (i.e., a new smaller bounding square is created).

All the remaining points lie outside the third square (the minimum bounding square shown at 475 in FIG. 4E) and so no additional distance calculations will need to be performed. Thus, the closest existing point to the given location (point 402) has been found, namely point 435.

The aforementioned process steps, with respect to solving the minimum distance determination problem, given an ordered set of points defining a spline or polyline, may be summarized as follows:

1. Determine the end point of the spline or polyline with the shortest distance to the given location or point.

2. Using this minimum distance, define an imaginary cube (square for two dimensions) about the point of location in such a manner that the minimum distance between the point and any side is the minimum distance determined in Step 1 along an orthogonal axis defining the given coordinate system.

3. Choosing either end of the spline or polyline, traverse the set of points describing the line, and
   (a) if a point on the line does not lie within the cube/square, it is discarded as being a farther distance from the location in question,
   (b) if a point on the line lies within the cube/square, the size of the cube/square is reduced and the point on the line is noted.

4. The previous step is repeated until all points on the polyline have been sized.

At the end of the process, the point or points noted are at a minimum distance between the location and the polyline.

FIGS. 4A–4E illustrate the steps involved in solving the minimum distance determination problem utilizing a process contemplated by the invention, i.e., without having to first determine the distance between given location 402 and each of the nine points depicted in FIGS. 4A–4E.

For the example depicted in FIGS. 4A–4E, the traditional method for solving the minimum distance determination problem would require 18 multiplications, 9 additions, the taking of 9 square roots and making 8 comparisons. The process contemplated by the invention requires 8 multiplications, 4 additions, the taking of 4 square roots and making 31 comparisons. The extra comparisons are much faster and easier to make (and more efficient), when compared with the amount of computing resources required to perform the additional multiplications, additions and square roots required by the prior art methods for solving the minimum distance determination problem. The result is that the desired transformation of signals that can be accomplished, with the aid of a digital computer, utilizing the present invention, makes a far more efficient use of computing resources than traditional processes for performing the aforementioned transformation of signals.

What has been described in detail hereinabove are methods and apparatus meeting all of the aforestated objectives. As previously indicated, those skilled in the art will recognize that the foregoing description has been presented for the sake of illustration and description only. It is not intended to be exhaustive or to limit the invention to the precise form disclosed, and obviously many modifications and variations are possible in light of the above teaching.

The embodiments and examples set forth herein were presented in order to best explain the principles of the instant invention and its practical application to thereby enable others skilled in the art to best utilize the instant invention in various embodiments and with various modifications as are suited to the particular use contemplated.

It is, therefore, to be understood that the claims appended hereto are intended to cover all such modifications and variations which fall within the true scope and spirit of the invention.

What is claimed is:

1. A method of operating a modeling system, including a predefined modeling coordinate system, with the aid of a digital computer to transform a first set of signals representing a given arbitrarily specified point and a given ordered set of points in said modeling coordinate system, into a second set of signals identifying a subset of points, belonging to said ordered set of points, which are located at a minimum distance from said specified point, comprising the steps of:

(a) providing said digital computer with a database for said modeling system including, at least, a first set of signals representing an arbitrarily specified point and a given ordered set of points, including first and second end points, in said modeling coordinate system;

(b) calculating in said computer, by processing said first set of signals, the distance $d_1$ between the specified point and said first end point, and the distance $d_2$ between said specified point and said second end point;

(c) comparing in said computer the values $d_1$ and $d_2$ to each other to determine which end point lies at minimum distance d from said specified point;

(d) selecting in said computer, from a set of end points consisting of said first end point and said second end point, an end point from said set of end points lying at minimum distance d from said specified point;

(e) storing, in the database of said computer as a second set of signals, signals representing the coordinates of the selected end point and minimum distance measure d;

(f) defining in said modeling coordinate system, with the aid of said computer, whenever said coordinate system is 3-dimensional, a third set of signals which represent the vertices of a cube, where the distance between the specified point and each side of said cube, along an orthogonal axis defining the given coordinate system, is d;

(g) traversing the given ordered set of points in accordance with the specified order, with the aid of said computer, starting at either of said first and second end points, sequentially testing each point to determine if it lies within the cube represented by said third set of signals; and (h) deriving the points in said given ordered set of points that lie a minimum distance from said specified point from the subset of points determined to lie within said cube.

2. A method as set forth in claim 1 further comprising the step of modifying said second set of signals if any new point lying a minimum distance from said specified point is determined to exist in said step of deriving.

3. A method as set forth in claim 1 wherein said step of deriving, for each point under test determined to be within said cube during said step of traversing, comprises the steps of:

(a) calculating in said computer the minimum distance d' between said specified point and the point under test in said step of traversing;

(b) comparing in said computer the distance measures d and d', to determine if distance measure d' is less than or equal to distance measure d; and (c) reducing the size of the previously defined cube, whenever distance measure d' is determined to be less than distance measure d in step (b), by replacing the members of said third set of signals with signals that represent the vertices of a new smaller cube, where the distance between the specified point and each side of said new smaller cube, along an orthogonal axis defining the given coordinate system, is d'.

4. A method as set forth in claim 3 further comprising the step of replacing the second set of signals stored in the computer database, whenever distance measure d' is determined to be less than distance measure d, with signals representing the coordinates of the point under test, and with signals representing minimum distance measure d'.

5. A method as set forth in claim 3 further comprising the step of adding to the second set of signals, stored in the computer database, signals representing the coordinates of the point under test whenever distance measure d' is determined to be equal to distance measure d.

6. A method as set forth in claim 1 wherein said ordered set of points lie on a polyline.

7. A method as set forth in claim 1 wherein said ordered set of points lie on a spline.

8. A method as set forth in claim 1 wherein said modeling system is a geographical information system.

9. A method as set forth in claim 1 wherein said modeling system is a geographical positioning system.

10. A method as set forth in claim 1 wherein said modeling system is a computer aided design system.

11. A method as set forth in claim 1 wherein said modeling system is a computer aided manufacturing system.

12. A method of operating a modeling system, including a predefined modeling coordinate system, with the aid of a digital computer to transform a first set of signals representing a given arbitrarily specified point and a given ordered set of points in said modeling coordinate system, into a second set of signals identifying a subset of points, belonging to said ordered set of points, which are located at a minimum distance from said specified point, comprising the steps of:

(a) providing said digital computer with a database for said modeling system including, at least, a first set of signals representing an arbitrarily specified point and a given ordered set of points, including first and second end points, in said modeling coordinate system;

(b) calculating in said computer, by processing said first set of signals, the distance $d_1$ between the specified point and said first end point, and the distance $d_2$ between said specified point and said second end point;

(c) comparing in said computer the values $d_1$ and $d_2$ to determine which end point lies at minimum distance d from said specified point;

(d) selecting in said computer, from a set of end points consisting of said first end point and said second end point, an end point from said set of end points lying at minimum distance d from said specified point;

(e) storing, in the database of said computer as a second set of signals, signals representing the coordinates of the selected end point and minimum distance measure d;

(f) defining in said modeling coordinate system, with the aid of said computer, whenever said coordinate system is 3-dimensional, a third set of signals which represent the vertices of a cube, where the distance between the specified point and each side of said cube, along an orthogonal axis defining the given coordinate system, is d;

(g) traversing the given ordered set of points in accordance with the specified order, with the aid of said computer, starting at either of said first and second end points, sequentially testing each point to determine if it lies within the cube represented by said third set of signals, and performing following steps (g1)–(g5) for each point under test determined to be within said cube:

(g1) calculating in said computer the minimum distance d' between said specified point and the point under test in step (g);

(g2) comparing in said computer the distance measures d and d', to determine if distance measure d' is less than or equal to distance measure d;

(g3) reducing the size of the previously defined cube, whenever distance measure d' is determined to be less than distance measure d in step (g2), by replacing the members of said third set of signals with signals that represent the vertices of a new smaller cube, where the distance between the specified point and each side of said new smaller cube, along an orthogonal axis defining the given coordinate system, is d';

(g4) replacing the second set of signals stored in the computer database, whenever distance measure d' is determined to be less than distance measure d in step (g2), with signals representing the coordinates of the point under test, and with signals representing minimum distance measure d'; and (g5) adding to the second set of signals, stored in said computer database, signals representing the coordinates of the point under test whenever distance measure d' is determined to be equal to distance measure d in step (g2), whereby the resultant second set of signals, stored in said computer database after the processing of the last point in said ordered set of points, is the desired transformation of said first set of signals into a set of signals identifying the subset of points, belonging to said ordered set of points, which are located at a minimum distance from said specified point.

13. A method as set forth in claim 12 wherein said step of defining further comprises the step of determining, with the aid of said computer, the vertices of said cube by circumscribing the sphere having radius d about said specified point, with a cube the sides of which are tangent to the sphere and parallel to the X–Y–Z plane in said 3-dimensional modeling coordinate system.

14. A method as set forth in claim 12 wherein the testing performed in said step of traversing is performed by comparing, in said computer, the (x,y,z) modeling system coordinates of each point under test, with the modeling system coordinates represented by said third set of signals which inherently define the sides of said cube.

15. A method as set forth in claim 12 wherein said ordered set of points lie on a polyline.

16. A method as set forth in claim 12 wherein said ordered set of points lie on a spline.

17. A method as set forth in claim 12 wherein said modeling system is a geographical information system.

18. A method as set forth in claim 12 wherein said modeling system is a geographical positioning system.

19. A method as set forth in claim 12 wherein said modeling system is a computer aided design system.

20. A method as set forth in claim 12 wherein said modeling system is a computer aided manufacturing system.

21. A method of operating a modeling system, including a predefined modeling coordinate system, with the aid of a digital computer to transform a first set of signals representing a given arbitrarily specified point and a given ordered set of points in said modeling coordinate system, into a second set of signals identifying a subset of points, belonging to said ordered set of points, which are located at a minimum distance from said specified point, comprising the steps of:

(a) providing said digital computer with a database for said modeling system including, at least, a first set of signals representing an arbitrarily specified point and a given ordered set of points, including first and second end points, in said modeling coordinate system;

(b) calculating in said computer, by processing said first set of signals, the distance $d_1$ between the specified point and said first end point, and the distance $d_2$ between said specified point and said second end point;

(c) comparing in said computer the values $d_1$ and $d_2$ to each other to determine which end point lies at minimum distance d from said specified point;

(d) selecting in said computer, from a set of end points consisting of said first end point and said second end point, an end point from said set of end points lying at minimum distance d from said specified point;

(e) storing, in the database of said computer as a second set of signals, signals representing the coordinates of the selected end point and minimum distance measure d;

(f) defining in said modeling coordinate system, with the aid of said computer, whenever said coordinate system is 2-dimensional, a third set of signals which represent the corners of a square, where the distance between the specified point and each side of said square, along an orthogonal axis defining the given coordinate system, is d;

(g) traversing the given ordered set of points in accordance with the specified order, with the aid of said computer, starting at either of said first and second end points, sequentially testing each point to determine if it lies within the square represented by said third set of signals; and (h) deriving the points in said given ordered set of points that lie a minimum distance from said specified point from the subset of points determined to be within said square.

22. A method as set forth in claim 21 further comprising the step of modifying said second set of signals if any new point lying a minimum distance from said specified point is determined to exist in said step of deriving.

23. A method as set forth in claim 21 wherein said step of deriving, for each point under test determined to be within said square during said step of traversing, comprises the steps of:

(a) calculating in said computer the minimum distance d' between said specified point and the point under test in said step of traversing;

(b) comparing in said computer the distance measures d and d', to determine if distance measure d' is less than or equal to distance measure d; and (c) reducing the size of the previously defined square, whenever distance measure d' is determined to be less than distance measure d in step (b), by replacing the members of said third set of signals with signals that represent the corners of a new smaller square, where the distance between the specified point and each side of said new smaller square, along an orthogonal axis defining the given coordinate system, is d'.

24. A method as set forth in claim 23 further comprising the step of replacing the second set of signals stored in the computer database, whenever distance measure d' is determined to be less than distance measure d, with signals representing the coordinates of the point under test, and with signals representing minimum distance measure d'.

25. A method as set forth in claim 23 further comprising the step of adding to the second set of signals, stored in the computer database, signals representing the coordinates of the point under test whenever distance measure d' is determined to be equal to distance measure d.

26. A method as set forth in claim 21 wherein said ordered set of points lie on a polyline.

27. A method as set forth in claim 21 wherein said ordered set of points lie on a spline.

28. A method as set forth in claim 21 wherein said modeling system is a geographical information system.

29. A method as set forth in claim 21 wherein said modeling system is a geographical positioning system.

30. A method as set forth in claim 21 wherein said modeling system is a computer aided design system.

31. A method as set forth in claim 21 wherein said modeling system is a computer aided manufacturing system.

32. A method of operating a modeling system, including a predefined modeling coordinate system, with the aid of a digital computer to transform a first set of signals representing a given arbitrarily specified point and a given ordered set of points in said modeling coordinate system, into a second set of signals identifying a subset of points, belonging to said ordered set of points, which are located at a minimum distance from said specified point, comprising the steps of:

(a) providing said digital computer with a database for said modeling system including, at least, a first set of signals representing an arbitrarily specified point and a given ordered set of points, including first and second end points, in said modeling coordinate system;

(b) calculating in said computer, by processing said first set of signals, the distance $d_1$ between the specified point and said first end point, and the distance $d_2$ between said specified point and said second end point;

(c) comparing in said computer the values $d_1$ and $d_2$ to each other to determine which end point lies at minimum distance d from said specified point;

(d) selecting in said computer, from a set of end points consisting of said first end point and said second end point, an end point from said set of end points lying at minimum distance d from said specified point;

(e) storing, in the database of said computer as a second set of signals, signals representing the coordinates of the selected end point and minimum distance measure d;

(f) defining in said modeling coordinate system, with the aid of said computer, whenever said coordinate system is 2-dimensional, a third set of signals which represent the corners of a square, where the distance between the specified point and each side of said square, along an orthogonal axis defining the given coordinate system, is d;

(g) traversing the given ordered set of points in accordance with the specified order, with the aid of said computer, starting at either of said first and second end points, sequentially testing each point to determine if it lies within the square represented by said third set of signals, and performing following steps (g1)–(g5) for each point under test determined to be within said cube:

(g1) calculating in said computer the minimum distance d' between said specified point and the point under test in step (g);

(g2) comparing in said computer the distance measures d and d', to determine if distance measure d' is less than or equal to distance measure d;

(g3) reducing the size of the previously defined square, whenever distance measure d' is determined to be less than distance measure d in step (g2), by replacing the members of said third set of signals with signals that represent the vertices of a new smaller square, where the distance between the specified point and each side of said new smaller square, along an orthogonal axis defining the given coordinate system, is d';

(g4) replacing the second set of signals stored in the computer database, whenever distance measure d' is determined to be less than distance measure d in step (g2), with signals representing the coordinates of the point under test, and with signals representing minimum distance measure d'; and (g5) adding to the second set of signals, stored in said computer database, signals representing the coordinates of the point under test whenever distance measure d' is determined to be equal to distance measure d in step (g2), whereby the resultant second set of signals, stored in said computer database after the processing of the last point in said ordered set of points, is the desired transformation of said first set of signals into a set of signals identifying the subset of points, belonging to said ordered set of points, which are located at a minimum distance from said specified point.

33. A method as set forth in claim 32 wherein said step of defining further comprises the step of determining, with the aid of said computer, the corners of said square by circumscribing the circle having radius d about said specified point, with a square the sides of which are tangent to the circle and parallel to the X–Y lines in said 2-dimensional modeling coordinate system.

34. A method as set forth in claim 32 wherein the testing performed in said step of traversing is performed by comparing, in said computer, the (x,y) modeling system coordinates of each point under test, with the modeling system coordinates represented by said third set of signals which inherently define the sides of said square.

35. A method as set forth in claim 32 wherein said ordered set of points lie on a polyline.

36. A method as set forth in claim 32 wherein said ordered set of points lie on a spline.

37. A method as set forth in claim 32 wherein said modeling system is a geographical information system.

38. A method as set forth in claim 32 wherein said modeling system is a geographical positioning system.

39. A method as set forth in claim 32 wherein said modeling system is a computer aided design system.

40. A method as set forth in claim 32 wherein said modeling system is a computer aided manufacturing system.

41. A method for determining a subset of points included in a given ordered set of points, that lies the minimum distance from an arbitrarily specified point in a given modeling coordinate system, for a modeling system aided by a digital computer, comprising the steps of:

(a) providing said digital computer with a database for said modeling system including, at least, a first set of signals representing said arbitrarily specified point and a given ordered set of points, in said modeling coordinate system;

(b) transforming with the aid of said computer said first set of signals into a second set of signals identifying the subset of points, belonging to said ordered set of points, which are located at a minimum distance from said specified point, wherein said step of transforming includes the steps of:

(b1) defining in said modeling coordinate system, with the aid of said computer, a third set of signals which represent the vertices of a geometric object for which the distance between the specified point and each side of said object, along an orthogonal axis defining said coordinate system, is the minimum distance d between the specified point and the end points of said ordered set of points;

(b2) traversing the given ordered set of points in accordance with the specified order, with the aid of said computer, starting at either of said end points, sequentially testing each point in said given ordered set of points to determine if it lies within the object represented by said third set of signals; and (b3) deriving the points in said given ordered set of points that lie a minimum distance from said specified point from the subset of points determined to lie within said geometric object; and (c) storing said second set of signals in said database.

42. A method as set forth in claim 41 wherein said step of deriving for each point under test determined to be within said object during said step of traversing, comprises the steps of:

(a) calculating in said computer the minimum distance d' between said specified point and the point under test in said step of traversing;

(b) comparing in said computer the distance measures d and d', to determine if distance measure d' is less than or equal to distance measure d; and (c) reducing the size of the previously defined object, whenever distance measure d' is determined to be less than distance measure d in step (b), by replacing the members of said third set of signals with signals that represent the vertices of a new smaller object, where the distance between the specified point and each side of said new smaller object, along an orthogonal axis defining the given coordinate system, is d'.

43. A method as set forth in claim 42 further comprising the steps of:

(a) replacing the second set of signals stored in said database, whenever distance measure d' is determined to be less than distance measure d, with signals representing the coordinates of the point under test, and with signals representing minimum distance measure d'; and (b) adding to the second set of signals, stored in the computer database, signals representing the coordinates of the point under test whenever distance measure d' is determined to be equal to distance measure d, whereby the resultant second set of signals, stored in said computer database after the processing of the last point in said ordered set of points, is the transformation of said first set of signals into a set of signals identifying the subset of points, belonging to said ordered set of points, which are located at a minimum distance from said specified point.

44. A method as set forth in claim 41 wherein said ordered set of points lie on a polyline.

45. A method as set forth in claim 41 wherein said ordered set of points lie on a spline.

46. A method as set forth in claim 41 wherein said modeling system is a geographical information system.

47. A method as set forth in claim 41 wherein said modeling system is a geographical positioning system.

48. A method as set forth in claim 41 wherein said modeling system is a computer aided design system.

49. A method as set forth in claim 41 wherein said modeling system is a computer aided manufacturing system.

50. A method as set forth in claim 41 wherein said geometric object is a square for a 2-dimensional modeling coordinate system.

51. A method as set forth in claim 41 wherein said geometric object is a cube for a 3-dimensional modeling coordinate system.

52. A method for determining subset of points included in a given ordered set of points, that lies the minimum distance from an arbitrarily specified point in a given predefined coordinate system, for a computer graphics system aided by a digital computer, comprising the steps of:

(a) providing said digital computer with a database for said computer graphics system including, at least, a first set of signals representing said arbitrarily specified point and a given ordered set of points, in said coordinate system;

(b) transforming with the aid of said computer said first set of signals into a second set of signals identifying the subset of points, belonging to said ordered set of points, which are located at a minimum distance from said specified point, wherein said step of transforming includes the steps of:

(b1) defining in said predefined coordinate system, with the aid of said computer, a third set of signals which represent the vertices of a geometric object for which the distance between the specified point and each side of said object, along an orthogonal axis defining said coordinate system, is the minimum distance d between the specified point and the end points of said ordered set of points;

(b2) traversing the given ordered set of points in accordance with the specified order, with the aid of said computer, starting at either of said end points, sequentially testing each point in said given ordered set of points to determine if it lies within the object represented by said third set of signals; and (b3) deriving the points in said given ordered set of points that lie a minimum distance from said specified point from the subset of points determined to lie within said geometric object; and (c) storing said second set of signals in said database.

* * * * *